US011323670B2

(12) United States Patent
Sakata

(10) Patent No.: US 11,323,670 B2
(45) Date of Patent: May 3, 2022

(54) LIGHT EMITTING APPARATUS AND PROJECTOR

(71) Applicant: SEIKO EPSON CORPORATION, Tokyo (JP)

(72) Inventor: Hidefumi Sakata, Tatsuno-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/209,543

(22) Filed: Mar. 23, 2021

(65) Prior Publication Data

US 2021/0297640 A1  Sep. 23, 2021

(30) Foreign Application Priority Data

Mar. 23, 2020  (JP) .............................. JP2020-050635

(51) Int. Cl.
*H04N 9/31* (2006.01)

(52) U.S. Cl.
CPC ......... *H04N 9/3152* (2013.01); *H04N 9/3158* (2013.01)

(58) Field of Classification Search
CPC .... H04N 9/315; H04N 9/3152; H04N 9/3158; H04N 9/3164; H04N 9/31; G02B 5/0278; G02B 5/0284; G02B 26/0841; G02B 5/02; G03B 21/20; G03B 21/2013; G03B 21/204; G03B 21/2066
USPC ...... 348/744, 750, 756, 757; 353/30, 33, 50, 353/73, 98, 99, 94; 359/599, 591, 707, 359/290
See application file for complete search history.

(56) References Cited

U.S. PATENT DOCUMENTS 7,984,994 B2 * 7/2011 Morikuni ............... G03B 21/10
                                                      353/99
2014/0232992 A1 * 8/2014 Egawa ................. G03B 21/208
                                                      353/30
2015/0301438 A1   10/2015 Akiyama et al.

FOREIGN PATENT DOCUMENTS

JP          2015-203857 A      11/2015

* cited by examiner

*Primary Examiner* — Sherrie Hsia
(74) *Attorney, Agent, or Firm* — Dority & Manning, P.A.

(57) ABSTRACT

A light emitting apparatus includes a first light source, a first angle converter, a second angle converter, and a diffuser that is provided on a light incident or exiting side of the first angle converter and diffuses the first light. The first angle converter includes a first light incident section on which the first light is incident, a first light exiting section via which the first light exits out of the first angle converter, and a first reflection section that reflects the first light incident via the first light incident section toward the first light exiting section. The second angle converter includes a second light incident section on which the first light having exited is incident, a second light exiting section via which the first light exits, and a second reflection section that reflects the first light incident via the second light incident section toward the second light exiting section. The area of the first light incident section is greater than the area of the first light exiting section, and the area of the second light incident section is smaller than the area of the second light exiting section.

11 Claims, 5 Drawing Sheets

LIGHT EMITTING APPARATUS AND PROJECTOR

The present application is based on, and claims priority from JP Application Serial Number 2020-050635, filed Mar. 23, 2020, the disclosure of which is hereby incorporated by reference herein in its entirety.

BACKGROUND

1. Technical Field

The present disclosure relates to a light emitting apparatus and a projector.

2. Related Art

As a light source apparatus used in a projector, there is a proposed light source apparatus that produces blue image light by using a diffusion plate to diffuse blue laser light (see JP-A-2015-203857).

However, the light source apparatus described above, in which a light collection system that causes the laser light to enter the diffusion plate is the combination of a plurality of lenses, has a problem of an increase in the size of the optical system.

SUMMARY

To solve the problem described above, according to a first aspect of the present disclosure, there is provided a light source apparatus including a first light source that outputs first light, a first angle converter on which the first light outputted from the first light source is incident, a second angle converter on which the first light having exited out of the first angle converter is incident, and a diffuser that is provided on a light incident or exiting side of the first angle converter and diffuses the first light. The first angle converter includes a first light incident section on which the first light is incident, a first light exiting section via which the first light exits out of the first angle converter, and a first reflection section that reflects the first light incident via the first light incident section toward the first light exiting section. The second angle converter includes a second light incident section on which the first light having exited out of the first angle converter is incident, a second light exiting section via which the first light exits out of the second angle converter, and a second reflection section that reflects the first light incident via the second light incident section toward the second light exiting section. An area of the first light incident section is greater than an area of the first light exiting section, and an area of the second light incident section is smaller than an area of the second light exiting section.

According to a second aspect of the present disclosure, there is provided a projector including an illuminator including a first light source apparatus including the light emitting apparatus according to the first aspect of the present disclosure, a light modulator that modulates light from the illuminator in accordance with image information, and a projection optical apparatus that projects the light modulated by the light modulator.

DESCRIPTION OF EXEMPLARY EMBODIMENTS

Embodiments of the present disclosure will be described below with reference to the drawings.

A projector according to the embodiments of the present disclosure is an example of a projector using a liquid crystal panel as a light modulator.

In the following drawings, components are drawn at different dimensional scales in some cases for clarity of each of the components.

First Embodiment

Figure 1:
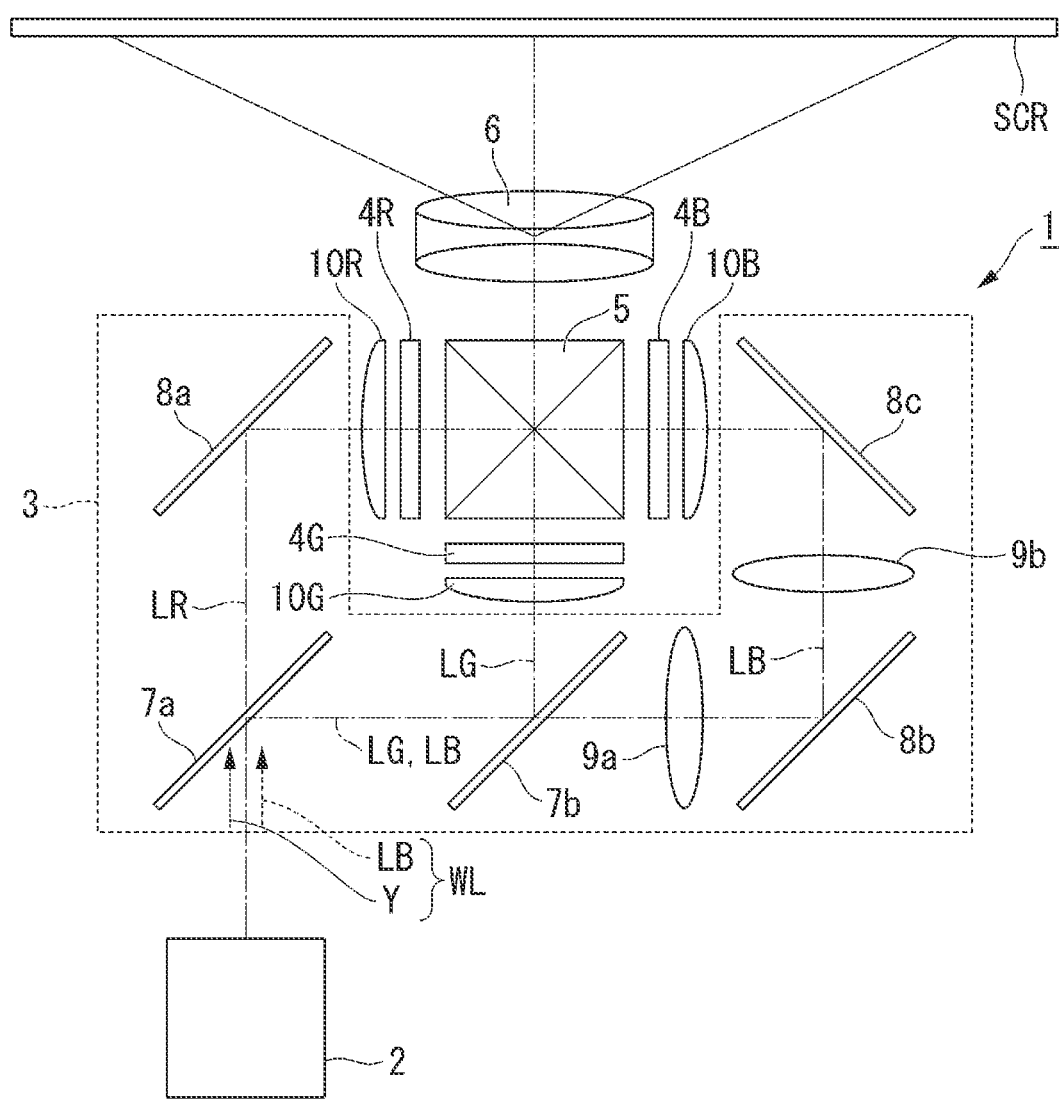
FIG. 1 shows the configuration of a projector according to a first embodiment.

FIG. 1 shows the configuration of the projector according to the present embodiment.

A projector 1 according to the present embodiment shown in FIG. 1 is a projection-type image display apparatus that displays a color image on a screen (projection receiving surface) SCR. The projector 1 uses three light modulators corresponding to color light fluxes, red light LR, green light LG, and blue light LB.

The projector 1 includes an illuminator 2, a color separation system 3, light modulators 4R, 4G, and 4B, a light combining system 5, and a projection optical apparatus 6.

Figure 2:
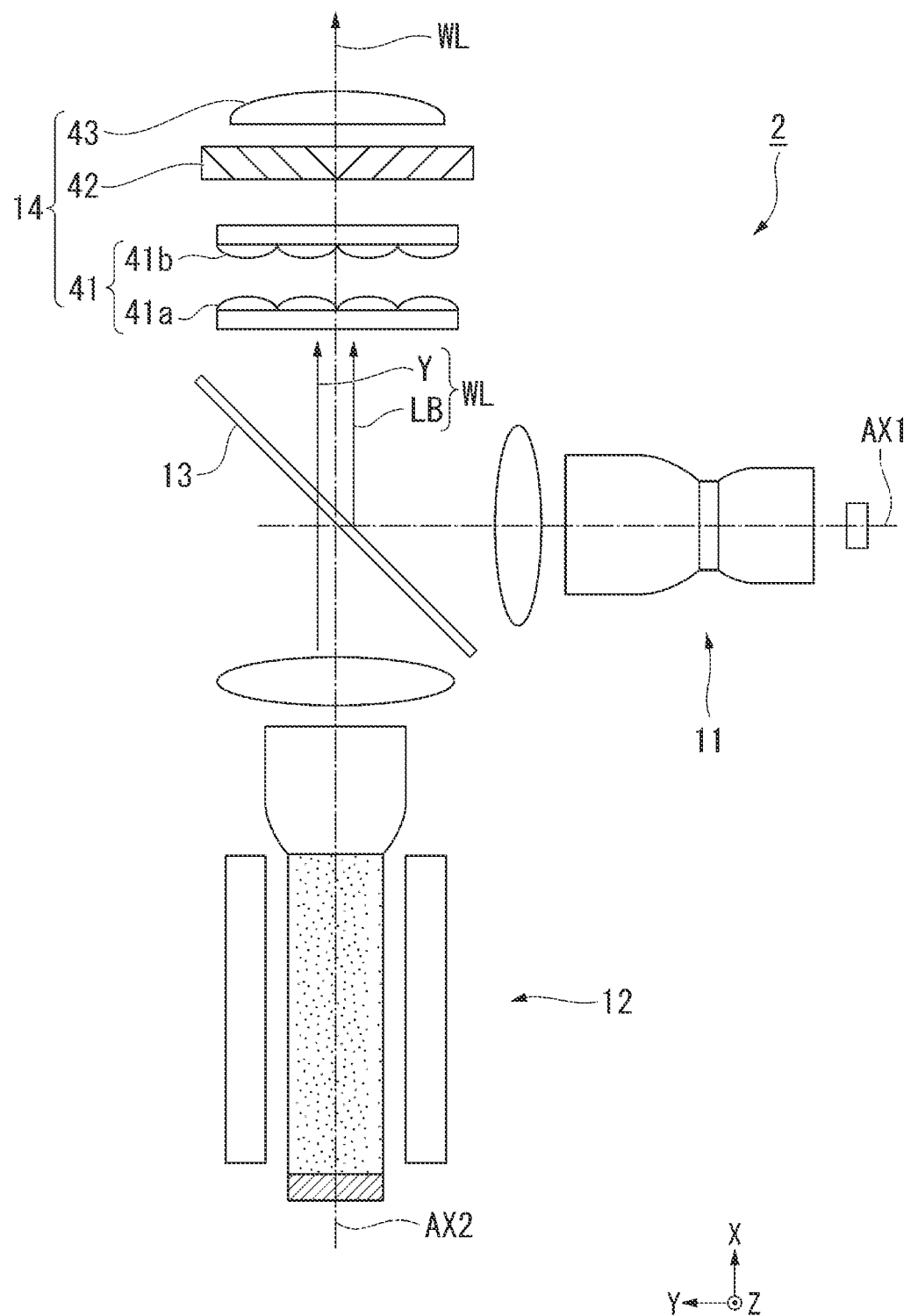
FIG. 2 shows a schematic configuration of an illuminator.

FIG. 2 shows a schematic configuration of the illuminator 2. In FIG. 2 and the following figures, the description will be made by using an XYZ orthogonal coordinate system as required. The axis Z is an axis extending upward and downward direction with respect to the illuminator 2, the axis X is an axis parallel to an optical axis AX1 of a first light source apparatus 11, and the axis Y is an axis parallel to an optical axis AX2 of a second light source apparatus 12 and perpendicular to the axes X and Z.

The illuminator 2 includes the first light source apparatus 11, the second light source apparatus 12, a dichroic mirror 13, and an illumination homogenizing system 14, as shown in FIG. 2. The illuminator 2 in the present embodiment outputs white illumination light WL toward the color separation system 3. The color separation system 3 separates the illumination light WL from the illuminator 2 into the red light LR, the green light LG, and the blue light LB.

Returning to FIG. 1, the color separation system 3 includes a first dichroic mirror 7a, a second dichroic mirror 7b, a first reflection mirror 8a, a second reflection mirror 8b, a third ref lection mirror 8c, a first relay lens 9a, and a second relay lens 9b.

The first dichroic mirror 7a separates the illumination light WL from the illuminator 2 into the red light LR and the other light, which is formed of the green light LG and the blue light LB. The first dichroic mirror 7a transmits the separated red light LR and reflects the other light, which is formed of the green light LG and the blue light LB. On the other hand, the second dichroic mirror 7b reflects the green light LG and transmits the blue light LB to separate the other light into the green light LG and the blue light LB.

The first reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and guide the blue light LB having passed through the second dichroic mirror 7b toward the light modulator 4B. The green light LG is reflected off the second dichroic mirror 7b toward the light modulator 4G.

The first relay lens 9a is disposed in the optical path of the blue light LB between the second dichroic mirror 7b and the second reflection mirror 8b. The second relay lens 9b is disposed in the optical path of the blue light LB between the second reflection mirror 8b and the third reflection mirror 8c.

The light modulator 4R modulates the red light LR in accordance with image information to form an image light flux corresponding to the red light LR. The light modulator 4G modulates the green light LG in accordance with image information to form an image light flux corresponding to the green light LG. The light modulator 4B modulates the blue light LB in accordance with image information to form an image light flux corresponding to the blue light LB.

The light modulators 4R, 4G, and 4B are each, for example, a transmissive liquid crystal panel. A polarizer (not shown) is disposed on the light incident side and the light exiting side of each of the liquid crystal panels and configured to transmit only linearly polarized light polarized in a specific direction.

Field lens 10R, 10G, and 10B are disposed on the light incident side of the light modulators 4R, 4G, and 4B, respectively. The field lens 10R, 10G, and 10B parallelize the chief rays of the red light LR, the green light LG, and the blue light LB incident on the respective light modulators 4R, 4G, and 4B.

The light combining system 5 receives the image light fluxes outputted from the light modulators 4R, 4G, and 4B, combines the image light fluxes corresponding to the red light LR, the green light LG, and the blue light LB with one another, and outputs the combined image light flux toward the projection optical apparatus 6. The light combining system 5 is, for example, a cross dichroic prism.

The projection optical apparatus 6 is formed of a plurality of projection lenses. The projection optical apparatus 6 enlarges the combined image light flux from the light combining system 5 and projects the enlarged image light flux toward the screen SCR. An image is thus displayed on the screen SCR.

The configuration of the first light source apparatus 11 will be subsequently described.

Figure 3:
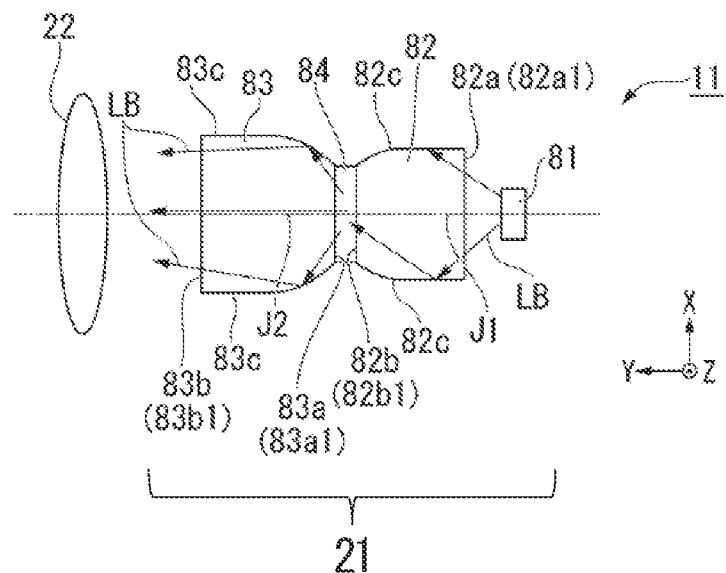
FIG. 3 shows the configuration of a first light source apparatus.

The first light source apparatus 11 includes a first light emitting apparatus (light emitting apparatus) 21 and a first pickup system 22, as shown in FIG. 3. The first light emitting apparatus 21 includes a first light source 81, a first angle converter 82, a second angle converter 83, and a diffuser 84.

The first light source 81 outputs the blue light (first light) LB formed of laser light. The first light source 81 includes at least one semiconductor laser. The blue light LB outputted from the first light source 81 enters the first angle converter 82. The diffuser 84 is provided on the light exiting side of the first angle converter 82 and diffuses the blue light LB. The blue light LB having exited out of the first angle converter 82 and having passed through the diffuser 84 enters the second angle converter 83.

The diffuser 84 in the present embodiment is provided between the first angle converter 82 and the second angle converter 83. In the present embodiment, the first angle converter 82 and the second angle converter 83 are connected to each other via the diffuser 84. The diffuser 84 is fixed to the first angle converter 82 and the second angle converter 83 via an optical adhesive (not shown). The diffuser 84, the first angle converter 82, and the second angle converter 83 desirably have refractive indices as close to each other as possible.

Since the first light emitting apparatus 21 in the present embodiment employs the configuration in which the diffuser 84 is sandwiched between the first angle converter 82 and the second angle converter 83, the diffuser 84 is readily held. No holding member for holding the diffuser 84 is therefore required, whereby the configuration of the light emitting apparatus can be simplified.

The first angle converter 82 includes a first light incident section 82a, on which the blue light LB outputted from the first light source 81 is incident, a first light exiting section 82b, via which the blue light LB exits out of the first angle converter 82, and a first reflection section 82c, which reflects the blue light LB incident via the first light incident section 82a toward the first light exiting section 82b.

In the present embodiment, the first angle converter 82 is formed of a compound parabolic concentrator (CPC). The first angle converter 82 is so shaped that the cross-sectional area thereof perpendicular to an optical axis J1 decreases along the light traveling direction, and the cross-sectional area of the first light exiting section 82b is smaller than the cross-sectional area of the first light incident section 82a. The area of the first light incident section 82a is a cross-sectional area of the first light incident section 82a that is the cross-sectional area perpendicular to the optical axis J1, that is, the area of an end surface 82a1 of the first light incident section 82a. The area of the first light exiting section 82b is a cross-sectional area of the first light exiting section 82b that is the cross-sectional area perpendicular to the optical axis J1, that is, the area of an end surface 82ab1 of the first light exiting section 82b. That is, the area of the end surface 82b1 of the first light exiting section 82b is smaller than the area of the end surface 82a1 of the first light incident section 82a. A cross section of the first reflection section 82c that is the cross section taken along a surface containing the optical axis J1 is formed of a parabolic surface. The optical axis J1 of the first angle converter 82 coincides with the optical axis AX1 of the first light source apparatus 11. In the present embodiment, the first angle converter 82 may be made, for example, of glass or any other material having a refractive index greater than that of the air, and the side surface of the first angle converter 82 may be provided with a reflection mirror. When the side surface is provided with a reflection mirror, the first angle converter 82 may have a tubular structure having an internal cavity.

The second angle converter 83 is provided on the side opposite the first angle converter 82 with respect to the diffuser 84. The second angle converter 83 includes a second light incident section 83a, on which the blue light LB having exited out of the first angle converter 82 is incident, a second light exiting section 83b, via which the blue light LB exits out of the second angle converter 83, and a second reflection section 83c, which reflects the blue light LB incident via the second light incident section 83a toward the second light exiting section 83b.

In the present embodiment, the second angle converter 83 is formed of a compound parabolic concentrator (CPC), as the first angle converter 82 is. The second angle converter 83 is so shaped that the cross-sectional area thereof perpendicular to an optical axis J2 increases along the light traveling direction, and the cross-sectional area of the second light exiting section 83*b* is greater than the cross-sectional area of the second light incident section 83*a*. The area of the second light incident section 83*a* is a cross-sectional area of the second light incident section 83*a* that is the cross-sectional area perpendicular to the optical axis J2, that is, the area of an end surface 83*a*1 of the second light incident section 83*a*. The area of the second light exiting section 83*b* is a cross-sectional area of the second light exiting section 83*b* that is the cross-sectional area perpendicular to the optical axis J2, that is, the area of an end surface 83*b*1 of the second light exiting section 83*b*. That is, the area of the end surface 83*b*1 of the second light exiting section 83*b* is greater than the area of the end surface 83*a*1 of the second light incident section 83*a*. A cross section of the second reflection section 83*c* that is the cross section taken along a surface containing the optical axis J2 is formed of a parabolic surface. The optical axis J2 of the second angle converter 83 coincides with the optical axis AX1 of the first light source apparatus 11. In the present embodiment, the second angle converter 83 may be made, for example, of glass or any other material having a refractive index greater than that of the air, and the side surface of the second angle converter 83 may be provided with a reflection mirror. When the side surface is provided with a reflection mirror, the second angle converter 83 may have a tubular structure having an internal cavity.

The blue light LB outputted from the first light source 81 is incident on the first light incident section 82*a* of the first angle converter 82. The blue light LB having entered the first angle converter 82 having the configuration described above changes its orientation while traveling in the first angle converter 82 in such a way that the angle of the direction of the blue light LB with respect to the optical axis J1 increases whenever the blue light LB is totally reflected off the first reflection section 82*c* having a parabolic shape.

In general, since the etendue of light specified by the product of the area of a light exiting region and the solid angle of the light (maximum exiting angle) is preserved, the etendue of the blue light LB before the blue light LB passes through the first angle converter 82 is preserved after the passage. The first angle converter 82 has the configuration in which the area of the end surface 82*b*1 of the first light exiting section 82*b* is smaller than the area of the end surface 82*a*1 of the first light incident section 82*a*, as described above. It can therefore be said even from a viewpoint of etendue preservation that the first angle converter 82 in the present embodiment allows the maximum exiting angle of the blue light LB that exits via the first light exiting section 82*b* is greater than the maximum incident angle of the blue light LB incident on the first light incident section 82*a*.

The first angle converter 82 thus makes the maximum exiting angle of the blue light LB that exits via the first light exiting section 82*b* greater than the maximum incident angle of the blue light LB incident on the first light incident section 82*a*. That is, the first light source apparatus 11 of the present embodiment can increase the angle of incidence of the blue light LB outputted from the first light source 81 and entering the diffuser 84.

The diffuser 84 diffuses the blue light LB by a predetermined diffusion degree. The diffuser 84 can, for example, be a light transmissive substrate having at least one surface provided with an irregular structure or a light transmissive substrate in which fillers having a refractive index different from that of the substrate are dispersed therein. The diffuser 84 is desirably configured to provide a small degree of backward scattering. As the configuration that reduces the degree of backward scattering, for example, it is conceivable to reduce the size of the inclining surfaces of the irregularity structure that form the surface or adjust the density and size of the fillers in such a way that the degree of forward scattering increases. The first light source apparatus 11 of the present embodiment, which uses the diffuser 64, allows reduction of the effect of variation in luminance and speckle noise that occur when the blue light LB formed of laser light, which is highly coherent, is used, whereby video images having high display quality can be displayed.

When the angle of incidence of the blue light LB incident on the diffuser 84 increases, the maximum exiting angle of the blue light LB that exits out of the diffuser 84 increases. The first light source apparatus 11 of the present embodiment, in which the blue light LB passes through the first angle converter 82, allows an increase in the angle of incidence of the blue light LB incident on the diffuser 84. The maximum exiting angle of the blue light LB that exits out of the diffuser 84 can thus be increased. The light orientation distribution of the blue light LB that exits out of the diffuser 84 thus approaches the light orientation distribution of fluorescence Y emitted in the Lambertian scheme from a wavelength converter 50 in the second light source apparatus 12, which will be described later.

The blue light LB is outputted from the first light source 81 at a large angle of radiation. The first angle converter 82 is so characterized as to efficiently guide light incident thereon within a predetermined angular range to the light exiting section. The angular range of light that can be taken in the first angle converter 82 is hereinafter referred to as a light reception angle in some cases.

In the present embodiment, since the light reception angle of the first angle converter 82 is so set as to be greater than the maximum exiting angle of the blue light LB outputted from the first light 81, the blue light LB outputted from the first light source 81 is mostly taken in the first angle converter 82.

The blue light LB having entered the first angle converter 82 at angles of incidence smaller than or equal to the light reception angle reaches the diffuser 84 directly or after reflected off the reflection section. That is, according to the first light source apparatus 11 in the present embodiment, the blue light LB only needs to be so located as to be taken in when the first light source 81 and the first angle converter 82 are positioned, so that the first light source 81 or the first angle converter 82 does not need to be exactly positioned, and the position of the first light source 81 may be slightly shifted from the exact position with no problem.

Therefore, according to the first light source apparatus 11 in the present embodiment, the first light source 81 and the first angle converter 82 are readily aligned with each other, whereby the assembly cost can be reduced.

The blue light LB diffused by the diffuser 84 is incident on the second light incident section 83*a* of the second angle converter 83. In the present embodiment, the area of the second light incident section 83*a* of the second angle converter 83 is greater than or equal to the area of the first light exiting section 82*b* of the first angle converter 82. The blue light LB having exited out of the diffuser 84 thus satisfactorily enters the second angle converter 83 via the second light incident section 83*a*.

The configuration in which the area of the second light incident section 83a differs from the area of the first light exiting section 82b allows the condition under which the first angle converter 82 receives the blue light LB and the condition under which the second angle converter 83 outputs the blue light LB to be independently adjusted, whereby the optical system design flexibility increases. As a result, a first light source 81 having a large light emission area or a first light source 81 that outputs light at a large angle of radiation can also be handled, whereby a light source apparatus capable of outputting brighter blue light LB can be provided.

The second angle converter 83 in the present embodiment also allows, from the viewpoint of etendue preservation, the maximum exiting angle of the blue light LB that exits out of the second light exiting section 83b to be smaller than the maximum incident angle of the blue light LB incident on the second light incident section 83a.

The blue light LB having entered the second angle converter 83 having the configuration described above changes its orientation while traveling in the second angle converter 83 in such a way that the direction of the blue light LB approaches the direction parallel to the optical axis J2 whenever the blue light LB is reflected off the second reflection section 83c having a parabolic shape.

In the second angle converter 83 in the present embodiment, the area of the second light exiting section 83b is greater than the area of the first light exiting section 82b.

According to the configuration described above, the amount of conversion of the angle of the light performed by the second angle converter 83 can be greater than the amount of conversion of the angle of the light performed by the first angle converter 82. A large amount of angular conversion means that the angle of the light before the light passes the angle converter greatly changes after the passage, and a small amount of angular conversion means that the angle of the light before the light passes the angle converter does not greatly change after the passage.

The blue light LB entering the second angle converter 83, which has been diffused before, is incident on the second light incident section 83a at large angles of incidence. Since the amount of angular conversion performed by the second angle converter 83 in the present embodiment is greater than that performed by the first angle converter 82 as described above, the second angle converter 83 allows the blue light LB having entered the second angle converter 83 at the large angles of incidence to approach paralleled light and exit via the second light exiting section 83b.

Therefore, according to the first light emitting apparatus 21 of the present embodiment, the second angle converter 83 can output the blue light LB having traveled via the diffuser 84 as light having an angular distribution within a predetermined exiting angle.

The blue light LB outputted from the first light emitting apparatus 21 enters the first pickup system 22. The first pickup system 22 is formed, for example, of one convex lens and parallelizes the blue light LB. The first light emitting apparatus 21 can thus produce and output the blue light LB formed of substantially parallelized light.

The configuration of the second light source apparatus 12 will subsequently be described.

Figure 4:
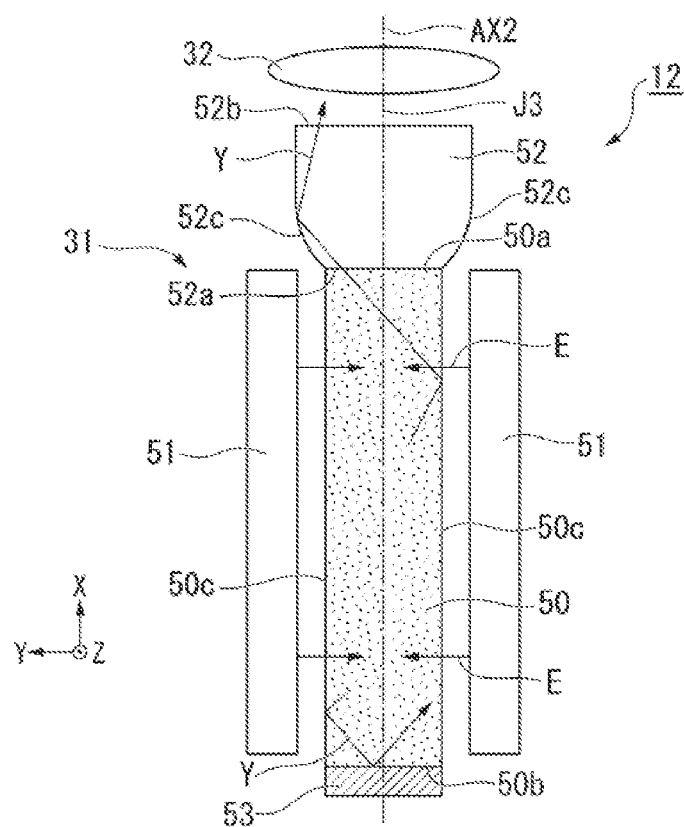
FIG. 4 is a schematic configuration diagram of a second light source apparatus.

FIG. 4 is a schematic configuration diagram of the second light source apparatus 12.

The second light source apparatus 12 includes a second light emitting apparatus 31 and a second pickup system 32, as shown in FIG. 4. The second light emitting apparatus 31 includes the wavelength converter 50, a second light source 51, a third angle converter 52, and a mirror 53.

The wavelength converter 50 has a quadrangular columnar shape extending in the axis-X direction and has a first end surface 50a and a second end surface 50b, which face each other, and four side surfaces 50c, which intersect the first end surface 50a and the second end surface 50b. The wavelength converter 50 at least contains a phosphor and converts excitation light E, which belongs to an excitation wavelength band, into the fluorescence (second light) Y, which belongs to a second wavelength band different from the first wavelength band, to which an excitation wavelength belongs. The excitation light E enters the wavelength converter 50 via the side surfaces 50c, and the fluorescence Y exits out of the wavelength converter 50 via the first end surface 50a.

The wavelength convener 50 does not necessarily have a quadrangular columnar shape and may instead have a triangular or other polygonal columnar shape. The wavelength converter 50 may still instead have a cylindrical shape.

The wavelength converter 50 contains a ceramic phosphor (polycrystal phosphor) that converts the excitation light E in terms of wavelength into the fluorescence Y. The wavelength band to which the fluorescence Y belongs is, for example, a yellow wavelength region ranging from 490 to 750 nm. That is, the fluorescence Y is yellow fluorescence containing a red light component and a green light component.

The wavelength converter 50 may contain a single crystal phosphor in place of a polycrystal phosphor. The wavelength converter 50 may instead be made of fluorescent glass. Still instead, the wavelength converter 50 may be formed of a binder which is made of glass or resin and in which a large number of phosphor particles are dispersed. The wavelength converter 50 made of the material described above converts the excitation light E into the fluorescence Y, which belongs to the second wavelength band.

Specifically, the material of the wavelength converter 50 contains, for example, an yttrium-aluminum-garnet-based (YAG-based) phosphor. Consider YAG:Ce, which contains cerium (Ce) as an activator by way of example, and the wavelength converter 50 can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, or a thermal plasma method or any other gas-phase method.

The second light source 51 includes LEDs that output the excitation light E, which is blue light. The second light source 51 is so provided as to face the side surfaces 50c of the wavelength converter 50 and outputs the excitation light E toward the side surfaces 50c. The excitation wavelength band, which is the first wavelength band, is, for example, a wavelength region corresponding to colors from violet to blue and ranges from 400 to 480 nm and having a peak wavelength of, for example, 445 nm. The second light source 51 may be so provided as to face part or entirety of the four side surfaces 50c of the wavelength converter 50.

The second light source 51 includes LEDs that output the blue excitation light E and may include not only the LEDs but other optical members, such as a light guide plate, a diffusion plate, and a lens. The number of LEDS is not limited to a specific number.

The mirror 53 is provided at the second end surface 50b of the wavelength converter 50. The mirror 53 reflects the fluorescence Y having been guided in the wavelength converter 50 and having reached the second end surface 50b.

The mirror 53 is formed of a metal film or a dielectric multilayer film formed on the second end surface 50b of the wavelength converter 50.

In the second light source apparatus 12 having the configuration described above, when the excitation light E outputted from the second light source 51 enters the wavelength converter 50, the phosphor contained in the wavelength converter 50 is excited, and the fluorescence Y emits from arbitrary light emission points. The fluorescence Y travels omnidirectionally from the arbitrary light emission points, and the fluorescence Y traveling toward the side surfaces 50c are totally reflected off the side surfaces 50c and travels toward the first end surface 50a or the second end surface 50b while repeatedly totally reflected. The fluorescence Y traveling toward the first end surface 50a enters the third angle converter 52. On the other hand, the fluorescence Y traveling toward the second end surface 50b is reflected off the mirror 53 and travels toward the first end surface 50a.

Out of the excitation light E having entered the wavelength converter 50, part of the excitation light E not having been used to excite the phosphor is reflected off objects around the wavelength converter 50, including the second light source 51, and the mirror 53 provided at the second end surface 50b and is therefore confined in the wavelength converter 50 and reused.

The third angle converter 52 has the same configuration at that of the second angle converter 83. The fact that the third angle converter 52 and the second angle converter 83 have the same configuration means that the two angle converters have the same shape and size. In the present embodiment, the third angle converter 54 is formed of a compound parabolic concentrator (CPC), as the second angle converter 83 is.

The third angle converter 52 includes a third light incident section 52a, on which the fluorescence Y emitted from the wavelength converter 50 is incident, a third light exiting section 52b, via which the fluorescence Y exits out of the third angle converter 52, and a third reflection section 52c, which reflects the fluorescence Y incident via the third light incident section 52a toward the third light exiting section 52b.

The third angle converter 52 is so shaped that the cross-sectional area thereof perpendicular to an optical axis J3 increases along the light traveling direction, and the cross-sectional area of the third light exiting section 52b is greater than the cross-sectional area of the third light incident section 52a. Specifically, the area of an end surface 52b1 of the third light exiting section 52b is greater than the area of an end surface 52a1 of the third light incident section 52a. A cross section of the third reflection section 52c that is the cross section taken along a surface containing the optical axis J3 is formed of a parabolic surface. The optical axis J3 of the third angle converter 52 coincides with the optical axis AX2 of the second light source apparatus 12.

The fluorescence Y emitted from the wavelength converter 50 is incident on the third light incident section 52a of the third angle converter 52. The fluorescence Y having entered the third angle converter 52 having the configuration described above changes its orientation while traveling in the third angle converter 52 in such a way that the direction of the fluorescence Y approaches the direction parallel to the optical axis J3 whenever the fluorescence Y is totally reflected off the third ref lection section 52c having a parabolic shape. The third angle converter 52 thus makes the maximum exiting angle of the fluorescence Y that exits via the third light exiting section 52b smaller than the maximum incident angle of the fluorescence Y incident on the third light incident section 52a.

Therefore, according to the second light emitting apparatus 31 of the present embodiment, the third angle converter 52 can output the fluorescence Y as light having an angular distribution within a predetermined exiting angle. The second light emitting apparatus 31 of the present embodiment, which includes the third apparatus 52 having the same configuration as that of the second angle converter 83 of the first light emitting apparatus 11, allows the light orientation distribution of the blue light LB outputted from the first light emitting apparatus 21 to approach the light orientation distribution of fluorescence Y emitted in the Lambertian scheme from the wavelength converter 50.

The fluorescence Y outputted from the second light emitting apparatus 31 enters the second pickup system 32. The second pickup system 32 is formed, for example, of one convex lens and parallelizes the fluorescence Y. The second light emitting apparatus 31 can thus produce and output the fluorescence Y formed of parallelized light having the same light orientation distribution as that of the blue light LB.

In the projector 1 according to the present embodiment, the blue light LB outputted from the first light source apparatus 11 and the fluorescence Y outputted from the second light source apparatus 12 are incident on the dichroic mirror 13, as shown in FIG. 2. The dichroic mirror 13 reflects the blue light LB from the first light source apparatus 11 and transmits the fluorescence Y from the second light source apparatus 12 to combine the blue light LB and the fluorescence Y with each other into the white illumination light WL. According to the present embodiment, the blue light LB and the fluorescence Y having light orientation distributions close to each other are combined with each other to produce the illumination light WL, whereby the thus produced illumination light WL is white light having reduced color unevenness.

The white illumination light WL resulting from the combination performed by the dichroic mirror 13 enters the illumination homogenizing system 14. The illumination homogenizing system 14 includes an optical integration system 41, a polarization converter 42, and a superimposing lens 43.

The optical integration system 41 is formed, for example, of a lens array 41a and a lens array 41b. The lens arrays 41a and 41b each include a plurality of lenslets arranged in an array.

The illumination light WL having passed through the optical integration system 41 enters the polarization converter 42. The polarization converter 42 converts the polarization direction of the light having exited out of the optical integration system 41. Specifically, the polarization converter 42 converts sub-light fluxes into which the lens array 41a divides the illumination light WL and which exit out of the lens array 41b into linearly polarized light fluxes. The polarization converter 42 includes a polarization separation layer that transmits one of polarized light components contained in the illumination light WL outputted from the illuminator 2 as a linearly polarized light component and reflects another one of the polarized light components as another linearly polarized light component in a direction perpendicular to the optical axis, a reflection layer that reflects the other linearly polarized light reflected off the polarization separation layer in the direction parallel to the optical axis, and a retardation film that converts the other linearly polarized light component reflected off the reflection layer into the one linearly polarized light component.

The illumination light WL having passed through the polarization converter 42 enters the superimposing lens 43. The superimposing lens 43 cooperates with the optical integration system 41 to homogenize the illuminance distribution of the illumination light WL in an illumination receiving region. The illuminator 2 thus outputs the illumination light WL.

The first light emitting apparatus 21 of the present embodiment provides the effects below.

The first light emitting apparatus 21 of the present embodiment includes the first light source 81, which outputs the blue light LB, the first angle converter 82, on which the blue light LB outputted from the first light source 81 is incident, the second angle converter 83, on which the blue light LB having exited out of the first angle converter 82 is incident, and the diffuser 84, which is provided on the light incident or exiting side of the first angle converter 82 and diffuses the blue light LB. The first angle converter 82 includes the first light incident section 82a, on which the blue light LB is incident, the first light exiting section 82b, via which the blue light LB exits out of the first angle converter 82, and the first reflection section 82c, which reflects the blue light LB incident via the first light incident section 82a toward the first light exiting section 82b. The second angle converter 83 includes the second light incident section 83a, on which the blue light LB having exited out of the first angle converter 82 is incident, the second light exiting section 83b, via which the blue light LB exits out of the second angle converter 83, and the second reflection section 83c, which reflects the blue light LB incident via the second light incident section 83a toward the second light exiting section 83b. The area of the first light incident section 82a is greater than the area of the first light exiting section 82b, and the area of the second light incident section 83a is smaller than the area of the second light exiting section 83b.

According to the first light emitting apparatus 21 of the present embodiment, the first angle converter 82 only needs to be disposed at the time of assembly within the range over which the blue light LB outputted from the first light source 81 can be taken in, the first light source 81 and the first angle converter 82 are readily aligned with each other. The assembly cost can therefore be reduced.

On the other hand, to cause a lens to pick up and parallelize the blue light LB scattered by the diffuser 84 at large angles of scattering, the lens needs to be a plurality of lenses, undesirably resulting in an increase in the size of the optical system and in turn an increase in the size of the light emitting apparatus configuration. In contrast, in the first light emitting apparatus 21 of the present embodiment, the second angle converter 83 takes in and parallelizes the blue light LB scattered by the diffuser 84 at large angles of scattering, whereby the size of the light emitting apparatus configuration can be reduced as compared with the case where the lenses are used.

Further, when the lenses are used as described above, the lenses each need to be have a large NA. Since a lens having a large NA produces a large amount of aberration, an image of the light source greatly blurs at a downstream optical system, for example, the lens array 41b, and the light leaks to the adjacent lens cells of the lens array 41b, resulting in optical loss. In contrast, in the first light emitting apparatus 21 of the present embodiment, the second angle converter 83 takes in the blue light LB instead of the lenses, and a lens having a large NA can be used, whereby the optical loss due to the aberrations can be reduced.

In the first light emitting apparatus 21 of the present embodiment, the first angle converter 82 and the second angle converter 83 are connected to each other via the diffuser 84.

The configuration described above eliminates the need for a holding member for holding the diffuser 84, whereby the light emitting apparatus configuration can be simplified.

In the first light emitting apparatus 21 of the present embodiment, the area of the second light exiting section 83b is greater than the area of the first light exiting section 82b.

According to the configuration described above, the degree of angular conversion performed by the second angle converter 83 can be greater than the degree of angular conversion performed by the first angle converter 82. The angle of the blue light LB diffused by the diffuser 84 can thus be converted and parallelized.

The projector 1 according to the present embodiment includes the illuminator 2, which includes the first light source apparatus 11 including the first light emitting apparatus 21, the light modulators 4R, 4G, and 4B, which modulate the light from the illuminator 2 in accordance with image information, and the projection optical apparatus 6, which projects the light modulated by the light modulators 4R, 4G, and 4B.

The projector 1 according to the present embodiment, which includes the first light source apparatus 11 including the first light emitting apparatus 21 described above, can be a projector having a small size and excels in light use efficiency.

In the projector 1 according to the present embodiment, the illuminator 2 includes the second light source apparatus 12, which outputs the fluorescence Y, which belongs to a wavelength band different from the wavelength band to which the blue light LB belongs, the second light source apparatus 12 includes the wavelength converter 50, which produces the fluorescence Y, and the third angle converter 52, on which the fluorescence Y emitted from the wavelength converter 50 is incident, and the third angle converter 52 and the second angle converter 83 have the same configuration.

The configuration described above allows the light orientation distribution of the blue light LB outputted from the first light emitting apparatus 21 to approach the light orientation distribution of fluorescence Y emitted in the Lambertian scheme from the wavelength converter 50. The illumination light WL outputted from the illuminator 2 is therefore produced by the combination of the blue light LB and the fluorescence Y having light orientation distributions close to each other, and the thus produced illumination light WL is white light having reduced color unevenness. The projector 1 according to the present embodiment using the illumination light WL described above can therefore display a high-quality image having reduced color unevenness.

Second Embodiment

The aforementioned embodiment has been described with reference to the case where the blue light LB and the fluorescence Y are combined with each other to produce the illumination light WL, whereas the blue light LB has an independent optical path in a projector according to the present embodiment.

Figure 5:
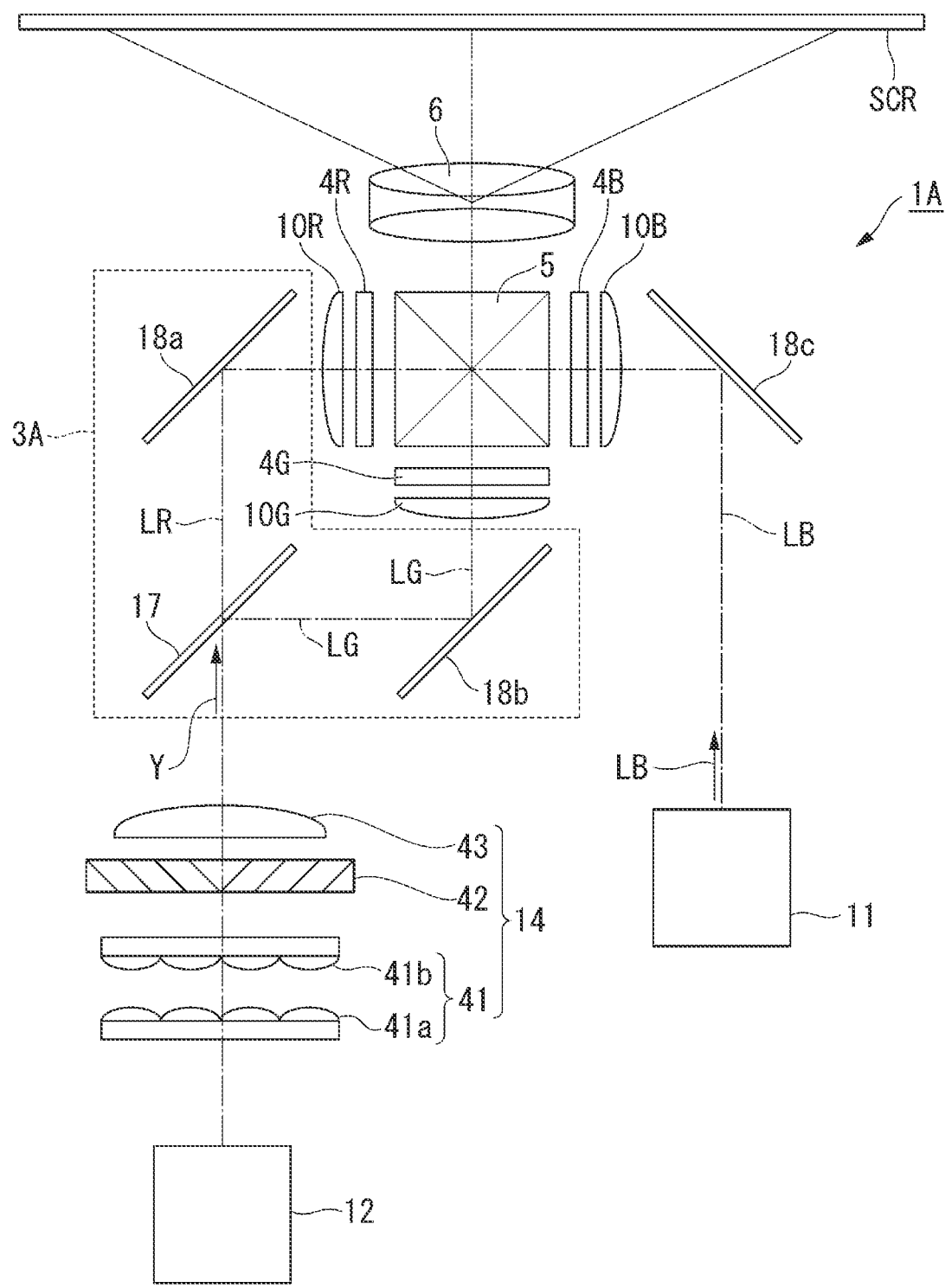
FIG. 5 shows the configuration of a projector according to a second embodiment.

FIG. 5 shows the configuration of the projector according to the present embodiment.

A projector 1A according to the present embodiment includes the first light source apparatus 11, the second light source apparatus 12, the illumination homogenizing system 14, a color separation system 3A, the light modulators 4R, 4G, and 4B, the light combining system 5, and the projection optical apparatus 6, as shown in FIG. 5. In the present variation, the fluorescence Y outputted from the second light source apparatus 12 enters the color separation system 3A via the illumination homogenizing system 14. The blue light LB outputted from the first light source apparatus 11 enters the light modulator 4B along a path different from the optical path of the fluorescence Y.

The color separation system 3A includes a dichroic mirror 17 and reflection mirrors 18a, 18b, and 18c.

The dichroic mirror 17 separates the fluorescence Y from the second light source apparatus 12 into the red light LR and the green light LG. The dichroic mirror 17 transmits the separated red light LR and reflects the separated green light LG. The reflection mirror 18a is disposed in the optical path of the red light LR and reflects the red light LR having passed through the dichroic mirror 17 toward the light modulator 4R. The reflection mirror 18b is disposed in the optical path of the green light LG and reflects the green light LG reflected off the dichroic mirror 17 toward the light modulator 4G.

The projector 1A according to the present embodiment can align the optical path of the blue light LB and the optical path of the fluorescence Y with each other in the same direction, whereby the optical systems are laid out with increased flexibility. When the blue light LB has an independent optical path, as in the present embodiment, the diffuser 84 of the first light source apparatus 11 is desirably formed of a reduced-multiple-scattering diffusion plate that diffuses the blue light LB in such a way that the diffusion is unlikely to disturb the polarization state thereof.

In the present embodiment, the blue light LB formed of laser light directly enters the light modulator 4B, whereby no polarization converter in the optical of the blue light is required, for example, by aligning the polarization direction of the blue light LB with the optic axis of a polarizer (not shown) provided on the light incident side of the light modulator 4B.

First Variation

A variation of the embodiments described above will subsequently be described. The aforementioned embodiments have been described with reference to the case where the diffuser 84 is provided on the light exiting side of the first angle converter 82, and the diffuser 84 may instead be provided on the light incident side of the first angle converter 82.

Figure 6:
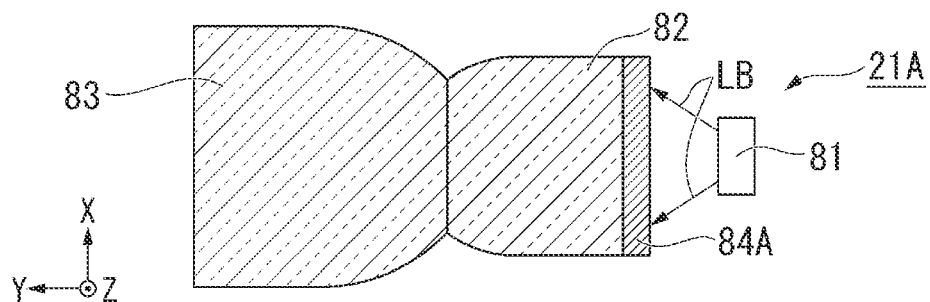
FIG. 6 shows the configuration of a first light emitting apparatus according to a first variation.

FIG. 6 shows the configuration of a first light emitting apparatus 21A according to a first variation.

In the first light emitting apparatus 21A according to the present variation, a diffuser 84A is provided on the light incident side of the first angle converter 82, as shown in FIG. 6. Specifically, the diffuser 84A is formed at the first light incident section 82a of the first angle converter 82. In the present variation, the first angle converter 82 and the second angle converter 83 are integrated with each other. The diffuser 84A may instead be separate from the first angle converter 82 or may be bonded to the first light incident section 82a.

In the present variation, the first light incident section 82a of the first angle converter 82 is so designed that the light reception angle is greater than the angle of radiation of the blue light LB diffused by the diffuser 84A when passing therethrough. The blue light LB having passed through the diffuser 84A thus efficiently enters the first angle converter 82.

According to the present variation, in which the diffuser 84A is formed at the first light incident section 82a, the optical loss at the interface between the diffuser 84A and the second angle converter 83 can be reduced. Further, since the first angle converter 82 and the second angle converter 83 can be integrated with each other, the structure of the first light emitting apparatus 21A can be simplified and the cost can therefore be reduced.

Further, the adhesive for bonding the diffuser 84A is not required between the first angle converter 82 and the second angle converter 83. An adhesive can deteriorate when exposed to the blue light LB. According to the present variation, in which no adhesive is used as described above, separation and breakage of the adhesive due to deterioration thereof due to the blue light LB and other problems can be suppressed. The reliability of the first light emitting apparatus 21A is therefore improved from the viewpoint of optical resistance against the blue light LB.

Second Variation

Figure 7:
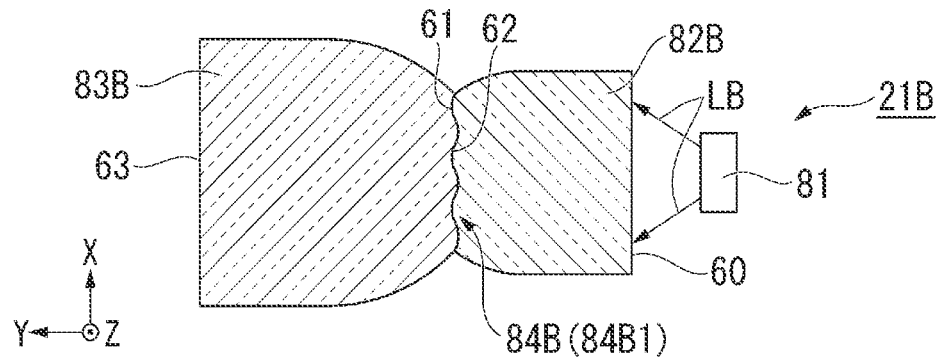
FIG. 7 shows the configuration of the first light emitting apparatus according to a second variation.

FIG. 7 shows the configuration of a first light emitting apparatus 21B according to a second variation. In the present variation, the same configuration as that in the embodiments described above has the same reference character and will not be described in detail.

The first light emitting apparatus 21B according to the present variation includes the first light source 81, a first angle converter 82B, a second angle converter 83B, and a diffuser 84B, as shown in FIG. 7. In the present variation, the first angle converter 82B and the second angle converter 83B are made of different materials. That is, the first angle converter 82B and the second angle converter 83B have different refractive indices.

The first angle converter 82B includes a first light incident section 60 and a first light exiting section 61, and the second angle converter 83B includes a second light incident section 62 and a second light exiting section 63.

In the present variation, the diffuser 84B is formed of a protrusion/recess structure 8431 having a plurality of protrusions or recesses formed at the interface between the first light exiting section 61 and the second light incident section 62.

According to the diffuser 84B in the present variation, when the blue light LB passes through the protrusion/recess structure 84B1 formed at the interface between the first light exiting section 61 and the second light incident section 62, the blue light LB is refracted in a variety of directions by the difference in refractive index at the interface and the protrusion/recess structure 84B1. The protrusion/recess structure 84B1 formed at the interface between the first light exiting section 61 and the second light incident section 62 thus functions as the diffuser 84B, which diffuses the blue light LB.

The first light emitting apparatus 21B of the present variation can also provide the same effects as those provided by the embodiments described above.

Third Variation

Figure 8:
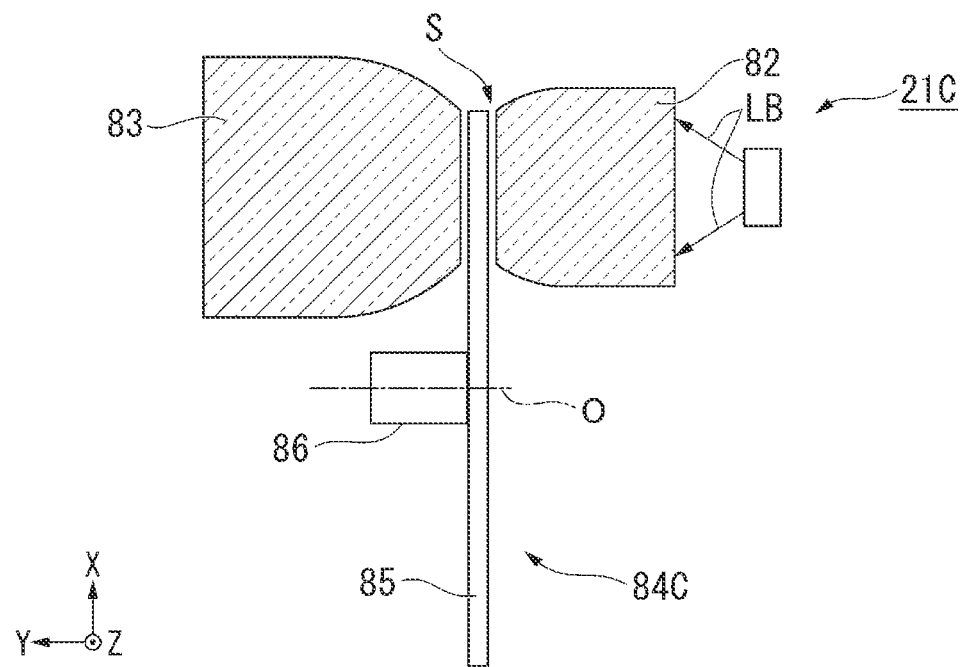
FIG. 8 shows the configuration of the first light emitting apparatus according to a third variation.

FIG. 8 shows the configuration of a first light emitting apparatus 21C according to a third variation.

The first light emitting apparatus 21C according to the present variation includes the first light source 81, the first angle converter 82, the second angle converter 83, and a diffuser 84C, as shown in FIG. 8. In the present variation, the diffuser 84C is rotatable. The diffuser 84C includes a disc-shaped diffusion plate 85 and a driver 86, which rotates the diffusion plate 85 around a predetermined axis of rotation O. The diffusion plate 85 is formed, for example, of a substrate having an irregularity structure. The irregularity structure can, for example, be microlenses, irregularities formed by performing a blast treatment, and a diffraction element.

In the present variation, the first angle converter 82 and the second angle converter 83 are disposed with a gap S provided between the first light exiting section 82b and the second light incident section 83a. That is, in the present variation, the first angle converter 82 and the second angle converter 83 are so disposed as to be separate from each other. The first angle converter 82 and the second angle converter 83 are held by respective holding members that are not shown.

The diffuser 84C is so disposed that part thereof is inserted into the gap S described above. The diffuser 84C allows a temporal change of a portion of the diffusion plate 85 that is the portion located in the gap S described above by rotating the diffusion plate 85. A portion of the diffusion plate 85 that is the portion through which the blue light LB passes can thus be temporally changed.

According to the first light emitting apparatus 21C of the present variation, the diffused state of the blue light LB that passes through the diffusion plate 85 is temporally changed, whereby the speckle pattern can be temporally changed. A temporally averaged speckle pattern is thus recognized by a viewer, whereby the speckle noise is less noticeable than when the diffusion plate 85 does not rotate. Further, the diffuser 84C can reduce interference unevenness due to the use of laser light as the blue light LB.

The technical scope of the present disclosure is not limited to that in the embodiments described above, and a variety of changes can be made thereto to the extent that the changes do not depart from the substance of the present disclosure.

For example, the aforementioned embodiments have been described with reference to the case where the first angle converters 82 and 82B and the second angle converters 83 and 83B are each formed of a compound parabolic concentrator (CPC), and one of the first angle converter 82 or 82B and the second angle converter 83 or 83B may be formed of a tapered rod having a cross-sectional area that changes along the light traveling direction.

The aforementioned embodiments have been described with reference to the case where any of the light emitting apparatuses according to the present disclosure is used in the transmissive projectors 1 and 1A, and any of the light emitting apparatuses according to the present disclosure can also be used in a reflective projector. The term "transmissive" used herein means that a liquid crystal light valve including a liquid crystal panel and other components transmits light. The term "reflective" used herein means that the liquid crystal light valve reflects light. The light modulators are each not limited to a liquid crystal light valve and may, for example, be a digital micromirror device.

In the embodiments described above, the projector using the three liquid crystal panels has been presented by way of example. The present disclosure is also applicable to a projector using only one liquid crystal light valve and a projector using four or more liquid crystal light valves.

The aforementioned embodiments have been described with reference to the case where any of the light source apparatuses according to the present disclosure is incorporated in a projector, but not necessarily. Any of the light source apparatuses according to the present disclosure may be used as a lighting apparatus, a headlight of an automobile, and other components.

What is claimed is:

1. A light emitting apparatus comprising:
a first light source that outputs first light;
a first angle converter on which the first light outputted from the first light source is incident;
a second angle converter on, which the first light having exited out of the first angle converter is incident; and
a diffuser that is provided on a light incident or exiting side of the first angle converter and diffuses the first light,
wherein the first angle converter includes
a first light incident section on which the first light is incident,
a first light exiting section via which the first light exits out of the first angle converter, and
a first reflection section that reflects the first light incident via the first light incident section toward the first light exiting section,
the second angle converter includes
a second light incident section on which the first light having exited out of the first angle converter is incident,
a second light exiting section via which the first light exits out of the second angle converter, and
a second reflection section that reflects the first light incident via the second light incident section toward the second light exiting section,
an area of the first light incident section is greater than an area of the first light exiting section, and
an area of the second light incident section is smaller than an area of the second light exiting section.

2. The light emitting apparatus according to claim 1, wherein the diffuser is provided on the light incident side of the first angle converter.

3. The light emitting apparatus according to claim 2, wherein the first angle converter and the second angle converter are integrated with each other.

4. The light emitting apparatus according to claim 3, wherein the diffuser is formed at the first light incident section.

5. The light emitting apparatus according to claim 1, wherein the diffuser is provided on the light exiting side of the first angle converter.

6. The light emitting apparatus according to claim 5, wherein the first angle converter and the second angle converter are connected to each other via the diffuser.

7. The emitting apparatus according to claim 5, wherein the first angle converter and the second angle converter have different refractive indices, and the diffuser is formed at an interface between the first light exiting section and the second incident section.

8. The light emitting apparatus according to claim 1, wherein the diffuser is rotatable.

9. The light emitting apparatus according to claim 1, wherein an area of the second light exiting section is greater than an area of the first light exiting section.

10. A projector comprising:
a illuminator including a first light source apparatus including the light emitting apparatus according to claim 1;
a light modulator that modulates light from the illuminator in accordance with image information; and
a projection optical apparatus that projects the light modulated by the light modulator.

11. The projector according to claim 10,
wherein the illuminator includes a second light source apparatus including a second light emitting apparatus that outputs second light that belongs to a wavelength band different from a wavelength band to which the first light belongs, the second light emitting apparatus includes a second light source, a wavelength converter that converts light outputted from the second light source in terms of wavelength to produce the second light, and a third angle converter on which the second light outputted from the wavelength converter is incident, and the third angle converter and the second angle converter have the same configuration.

\* \* \* \* \*